Feb. 4, 1941.   G. C. BENNETT   2,230,924
GROOVING CUTTER
Filed June 5, 1939   3 Sheets-Sheet 1
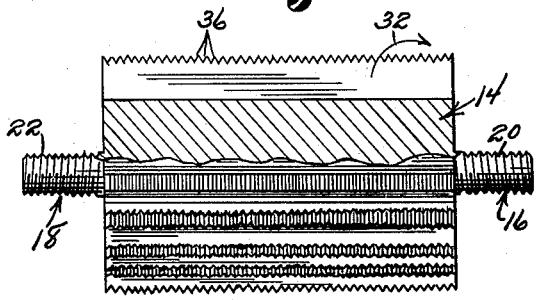
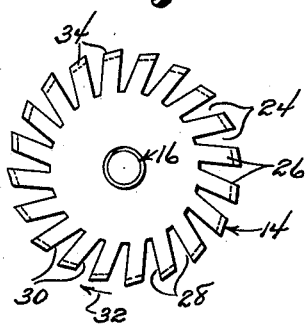
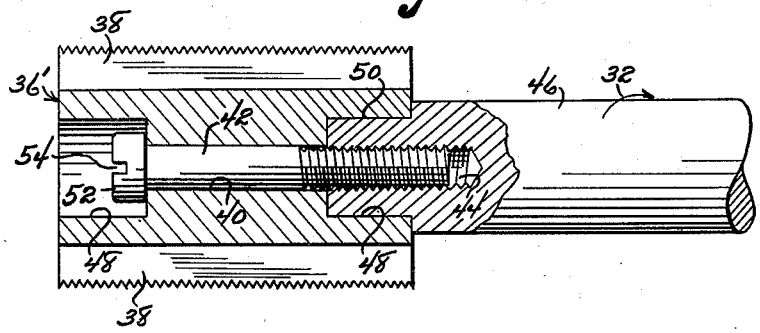
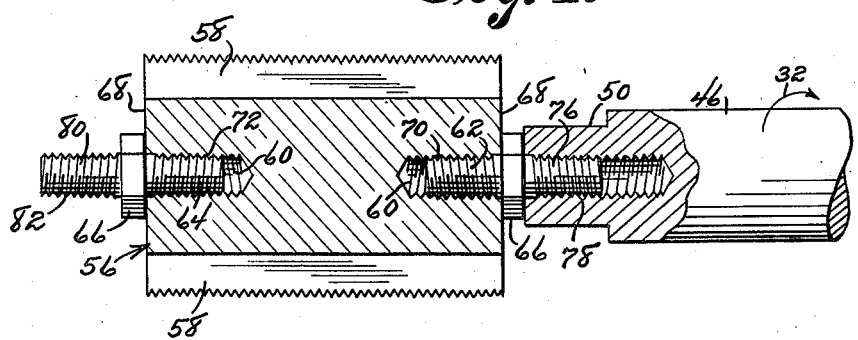
George C. Bennett
INVENTOR
BY Victor J. Evans & Co.
ATTORNEYS Feb. 4, 1941.   G. C. BENNETT   2,230,924
GROOVING CUTTER
Filed June 5, 1939   3 Sheets-Sheet 2

George C. Bennett
INVENTOR
BY Victor J. Evans & Co.
ATTORNEYS

Feb. 4, 1941.    G. C. BENNETT    2,230,924
GROOVING CUTTER
Filed June 5, 1939    3 Sheets-Sheet 3

George C. Bennett
INVENTOR
BY Victor J. Evans & Co.
ATTORNEYS

Patented Feb. 4, 1941

2,230,924

UNITED STATES PATENT OFFICE 2,230,924

GROOVING CUTTER

George C. Bennett, Huntsville, Ala.

Application June 5, 1939, Serial No. 277,559

1 Claim. (Cl. 69—1)

My invention relates to the art of manufacturing and repairing shoes, and has among its objects and advantages the provision of an improved roughing cutter.

An object of my invention is to provide a roughing cutter fashioned to cut grooves in shoe shanks, half soles and the like wherein the cutter is provided with a series of blades fashioned with grooving teeth in which the toothed cutting edges are so fashioned as to eliminate friction. In addition, the blades are so designed and arranged as to facilitate grinding to the end that the grooving teeth might be effectively sharpened.

Another object is to provide a roughing cutter designed for association with the usual edge trimmer shaft of shoe machinery wherein means are employed to facilitate connection of the roughing cutter with either end of the shaft.

Another object is to provide a roughing cutter including relatively thin blades provided with notched cutting edges wherein the blades and/or the cutter may be reversed for rotation in the other direction so as to maintain longer cutting life.

In the accompanying drawings:

Figure 1 is an elevational view of a roughing cutter in accordance with my invention with a part broken away for the sake of clearness;

Figure 2 is an end elevational view;

Figure 3 is a longitudinal sectional view of a cutter along the lines of Figures 1 and 2 but illustrating a bolt connection between the cutter and the edge trimmer shaft;

Figure 4 is a longitudinal sectional view of a cutter along the lines of Figures 1 and 2 but illustrating stud bolts for connecting the cutter with either end of the edge trimmer shaft;

Figure 5:
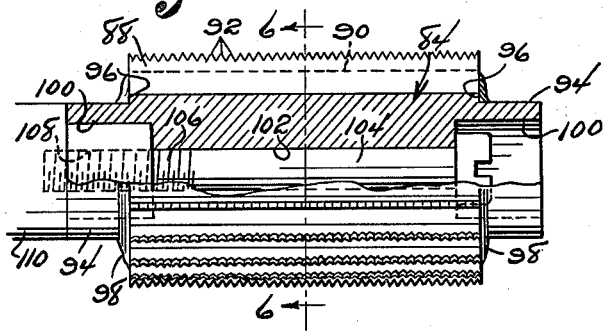
Figure 5 is an elevational view of a cutter embodying a bolt connection such as that illustrated in Figure 3 but made up of a cylindrical body having blades fixedly related thereto.

In the embodiment selected to illustrate my invention, Figures 1 and 2 illustrate a cylindrical body 14 provided with extensions 16 and 18 coaxially arranged with respect to the axis of the body. Extension 16 is provided with right hand threads 20, while section 18 is provided with left hand threads 22. Extensions 16 and 18 are adapted for threaded connection with the threaded bores in the ends of the edge trimmer shaft of a shoe machine (not shown). In providing right and left hand threads on the extensions 16 and 18, respectively, the cutter of Figs. 1 and 2 may be connected with either end of the edge trimmer shaft with the threads 20 and 22 respectively arranged to prevent unscrewing of the cutter from the edge trimmer shaft, which rotates in the same direction at all times.

Cylindrical body 14 is provided with a plurality of longitudinal grooves 24 of considerable depth to provide blades 26 extending the full length of the cylindrical body. Blades 26 are equally spaced with their front faces 28 paralleling their respective rear faces 30, and the grooves 24 are of such width as to provide considerable spacing between the blades. The cutter rotates in the direction of the arrow 32, which is also true of the edge trimmer shaft (not shown), and the blades are provided with relief angles 34 at their edges, with the edges fashioned to provide teeth 36 for grooving the half sole or other work preparatory to adhesively securing the part to another part in the shoe.

In attaching half soles and connecting other parts through the medium of a suitable cement, an effective cemented joint is secured through the medium of interfitting grooves and ribs throughout the cemented joint. Teeth 36 of each blade are aligned with the teeth of all the other blades so as to effectively groove the work to the end that the two joined pieces will have clean cut interfitting rib-like formations which greatly increase the area of the parts in the glued or cemented joint. At the same time, such surface irregularities provide efficient anchoring surfaces for the cement.

Fig. 2 illustrates the teeth 36 as extending transversely the full width of the angular edges 34 of the blades 26. Effective work can be done only with cutters having sharp teeth, and the cutting face of the cutter must be such as to eliminate friction incident to cutters wherein the grooving faces are of wide areas concentrically arranged with respect to the axis of rotation of the cutter. The angular edges 34 embody the necessary relief and the leading faces 28 of the blades intersect the forward ends of the teeth 36 so that the latter present sharp cutting points to the work being grooved. Teeth 36 may be sharpened by merely grinding the leading faces 28 in slight degrees. Thus, the blades 26 may be repeatedly ground to maintain the teeth 36 in a sharpened condition over a relatively long period of time. In addition, the spacing between the teeth 26 is such as to provide accommodation for particles which may be cut from the shoe sole or other work. The spaces are of such extent as to readily accommodate suitable grinding tools for sharpening purposes. The longitudinal axes of the teeth 36 are arranged at acute angles to their respective leading faces 28 so that grinding away material on the leading faces will provide the leading ends of the teeth with sharp points capable of cutting clean grooves.

With the cutter of Figs. 1 and 2 rotating in the direction of the arrows 32, extension 16 having the right hand threads will be threaded into the bore in the left hand end of the edge trimmer shaft when viewed from the operator's position, so that the extension will thread tightly into the bore for maintaining its end of the cutter tight against the end of the shaft. Similarly, the extension 18 is threaded into the bore in the left hand end of the edge trimmer shaft so as to maintain effective connection between the cutter and the shaft. Thus, I provide a cutter which may be threadedly connected with either end of the edge trimmer shaft, which shaft rotates in one direction only.

Fig. 3 illustrates a cylindrical body 36 having blades 38 identical with the blades 26, with the cylindrical body provided with a longitudinal bore 40 for the reception of a bolt 42 adapted to thread into the bore 44 in the edge trimmer shaft 46. Cylindrical body 36 is provided with an enlarged bore 48 in each end, and the edge trimmer shaft 46 is provided with a smaller diameter shank 50 at each end of the same diameters as the bores 48. The bores 48 are of such diameter and depth as to completely house the head 52 of the bolt, which head may be provided with a slot 54 for the reception of an instrument, such as a screw driver, to facilitate threading of the bolt into the bore 44 of the edge trimmer shaft.

In Fig. 3, I illustrate the edge trimmer shaft 46 as rotating in the direction of the arrow 32, with the cutter mounted on the left hand end of the shaft. Bolt 42 is provided with right hand threads so that the cutter will be maintained in effective connected relation with the shaft. Similarly, when the cutter is mounted on the right hand end of the edge trimmer shaft 46, a bolt having left hand threads will be utilized.

Fig. 4 illustrates a cutter including a cylindrical body 56 and toothed blades 58 identical with the blades 26 of Figs. 1 and 2. Body 56 is provided with threaded bores 60 coaxially arranged with respect to the axis of the body for the reception of stud bolts 62 and 64. Each bolt includes a nut part 66 adapted to be drawn against its respective end face 68 of the body 56, and the stud bolt 62 includes a threaded shank 70 threaded into its respective bore 60, while the bolt 64 includes a threaded shank 72 threaded into its respective bore 60. Shank 70 is provided with right hand threads, while shank 72 includes left hand threads. Screw 62 includes a bolt extension 76 having right hand threads 78, and bolt 64 includes a bolt extension 80 having left hand threads 82. Fig. 4 illustrates the nut part 66 of the stud bolt 62 as being arranged in abutting relation with the reduced diameter extension 50 on the left hand end of the edge trimmer shaft 46. Screw 64 is employed for connecting the cutter with the right hand end of the edge trimmer shaft.

Fig. 5 illustrates a cylindrical body 84 provided with a series of longitudinally and radially arranged slots 86 into which relatively thin blades 88 are disposed, with the blades projecting considerable margins beyond the circumferential face 90 of the cylindrical body. The blades are provided with groove cutting teeth 92. According to Fig. 5, the cylindrical body 84 is provided with reduced diameter extensions 94 at its ends to provide shoulders 96. Blades 86 have lengths exactly equaling the length of the cylindrical body 84 between the shoulders 96, and the ends of the blades are precisely aligned with the shoulders and made secure by electric welding 98. Thus, the blades 86 are effectively secured against accidental endwise shifting so that the teeth 92 will remain perfectly aligned for cutting clean grooves.

The ends of the cylindrical body 84 are provided with bores 100 conforming to the bores 48 of Fig. 3, and the cylindrical body is also provided with a longitudinal bore 102, which corresponds to the bore 40 of Fig. 3, for the reception of a bolt 104. Fig. 5 illustrates the bolt 104 as being provided with left hand threads 106 to be threaded into the bore 108 in the right hand end of the edge trimmer shaft 110. Blades 86 are relatively thin, and the cylinder 84 is designed for connection with either end of the edge trimmer shaft 110, or the cutter may be reversed end to end at one end of the shaft, so that the cutter may be reversed to present the opposite faces of the blades to the work as the cutter is rotated. Thus, the cutter may be operated until such time as the teeth are dulled on one face of the blades, after which the cutter is reversed for presenting the opposite faces of the blades, or ends of the teeth, to the work. Accordingly, the cutter may be reversed from time to time to present the opposite faces of the blades to the work.

Figure 6:
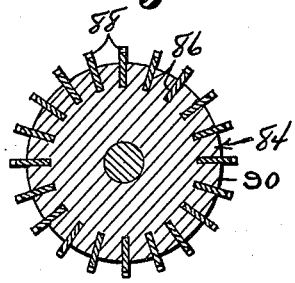
Figure 6 is a sectional view along the line 6—6 of Figure 5.
Figure 7:
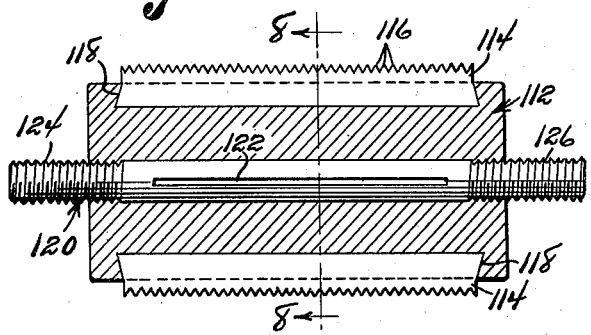
Figure 7 is a longitudinal sectional view of a cutter in which the cylindrical body is die-cast about the attaching screw with the blades cast in the cylindrical body.
Figure 8:
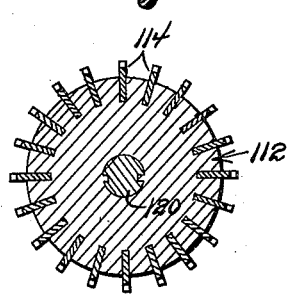
Figure 8 is a sectional view along the line 8—8 of Figure 7.

Figs. 7 and 8 illustrate a different form of construction wherein the cylindrical body 112 is die-cast about considerable margins of relatively thin blades 114 of the type illustrated in Figs. 5 and 6, which blades are provided with grooving teeth 116. Blades 114 have their ends angled outwardly, as at 118 in Fig. 7, so that the margins of the blades embedded in the cylinder 112 take the form of dovetail tenons when viewed according to Fig. 7. Thus, the blades 114 are effectively retained inside the material of the cylinder 112.

A shaft 120 is incorporated inside the cylinder 112 at the time of die-casting, and the shaft may be provided with suitable keys 122 to prevent unloosening of the cylinder with respect to the shaft. The shaft is of greater length than the cylinder 112 to provide extensions 124 and 126, which extensions are illustrated with right hand threads for connection with the left hand end of the edge trimmer shaft, thus permitting the cutter to be reversed on that end of the shaft.

Figure 9:
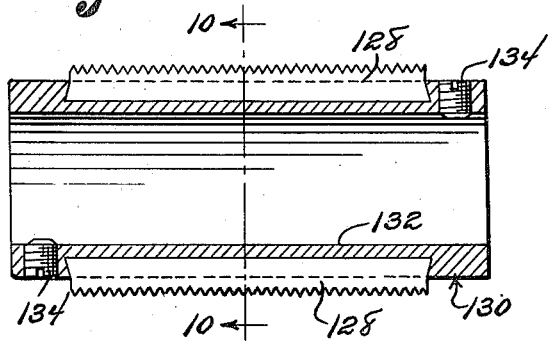
Figure 9 is a longitudinal sectional view of a cutter provided with a bore for the reception of the edge trimmer shaft and adapted to be fixedly secured thereto by set screws.
Figure 10:
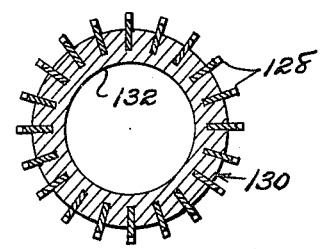
Figure 10 is a sectional view along the line 10—10 of Figure 9.

In Figs. 9 and 10, I illustrate a cutter in which the blades 128, identical with the blades 114 of Figs. 7 and 8, have margins embedded in a die-cast sleeve 130, the bore 132 of which is of such diameter as to receive the edge trimmer shaft. Sleeve 130 is provided with set screws 134 for fixedly relating the sleeve to the shaft.

Figure 11:
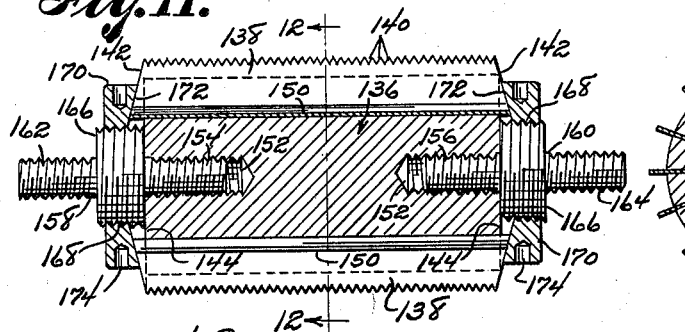
Figure 11 is a longitudinal sectional view of a cutter embodying a cylindrical body with blades insertable in slots illustrating stud screws for connection with either end of the edge trimmer shaft along the lines of Figure 4, with retaining and aligning collars threadedly associated with the stud bolts for fixedly relating the blades to the cylindrical body.
Figure 12:
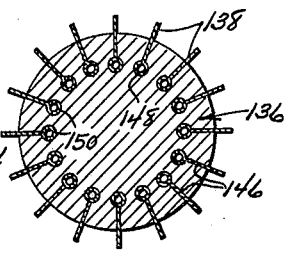
Figure 12 is a sectional view along the line 12—12 of Figure 11.

Figs. 11 and 12 illustrate a cylindrical body 136 which carries a plurality of blades 138 having groove cutting teeth 140 identical with the teeth of Figs. 5 to 10, inclusive. Blades 138 have angular ends 142 which extend slightly beyond the ends 144 of the cylindrical body. The cylindrical body is provided with longitudinal slots 146 for the reception of the greater margins of the blades 138, and the slots 146 lead into bores 148 which snugly receive the curled inner edges 150 of the blades.

Fig. 11 illustrates the cylindrical body 136 as being provided with threaded bores 152 for the reception of threaded shanks 154 and 156, respectively. Shanks 154 and 156 comprise threaded runs on stud bolts 158 and 160, respectively, which stud bolts are respectively provided with threaded shanks 162 and 164. The stud bolts 158 and 160 are provided with flanges 166 which abut their respective ends of the cylindrical body 136 and are provided with threads 168 on their peripheral surfaces for reception of nuts 170 having concaved faces 172 angled to engage the angular ends 142 of the blades 138. Nuts 170 are provided with bores 174 for the reception of a spanner wrench to facilitate tightening.

Blades 138 are of equal lengths so that the blades will be perfectly aligned when the nuts 170 are tightened, with the teeth 140 in the blades precisely aligned for groove cutting purposes. Shanks 162 and 164 are provided with right hand threads so that either shank may be threaded into a bore in the left hand end of the edge trimmer shaft. Thus, the cutter of Figs. 11 and 12 may be reversed on the left hand end of the edge trimmer shaft. Shanks 154 and 156 are also provided with right hand threads. Blades 138 are fixedly related to the cylindrical body 136 by reason of the nuts 170, and the blades may be removed from the cylindrical body by removing one of the nuts 170, thus permitting substitution of blades in the event of damage to blades in the cutter.

Figure 13:
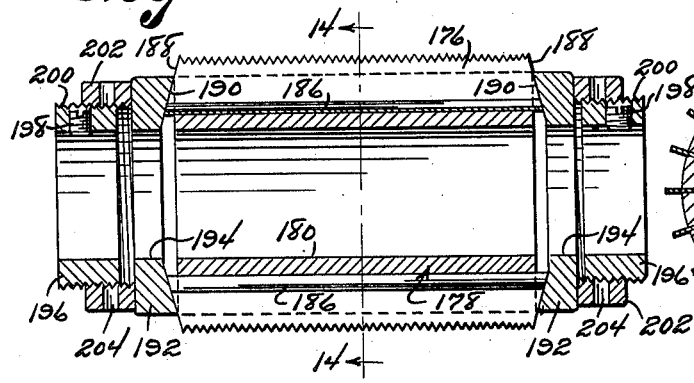
Figure 13 is a longitudinal sectional view of a cutter along the lines of Figure 11 but illustrating the cylindrical body provided with a bore for the reception of the edge trimmer shaft.
Figure 14:
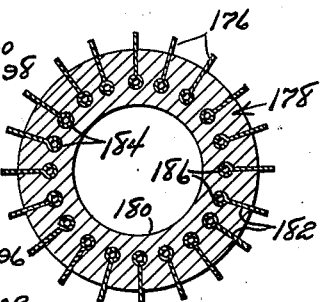
Figure 14 is a sectional view along the line 14—14 of Figure 13.

Figs. 13 and 14 illustrate another form in which the blades 176 are identical with the blades 138, but in which the blades are carried by a sleeve 178 provided with a bore 180 for reception of the edge trimmer shaft. Sleeve 178 is slotted at 182 and provided with communicating bores 184 for respective reception of the blades and their turned edges 186 in the manner of the blades and cylinder structure of Figs. 11 and 12.

Referring to Fig. 13, the angular ends 188 of the blades are engaged by the concaved faces 190 of pressure washers 192 having bores 194 of the same diameters as the bore 180. Collars 196 are adapted to be mounted on the edge trimmer shaft and to be fixedly related to the shaft by set screws 198. Collars 196 are threaded at 200 for threaded connection with nuts 202 arranged to press against the clamping washers 192 for urging the latter against the ends of the blades 176. Nuts 202 are provided with bores 204 for the reception of a spanner wrench. Thus, the cutter of Figs. 13 and 14 may be mounted on the edge trimmer shaft in the same manner as the cutter of Figs. 9 and 10.

Figure 15:
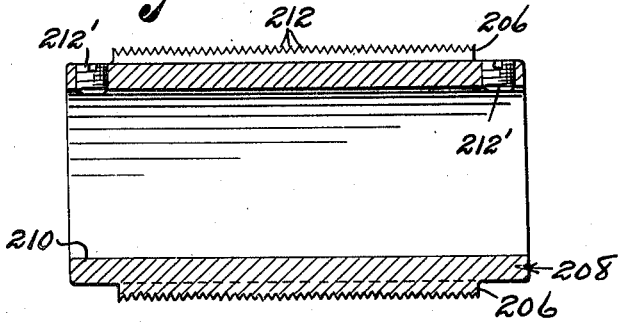
Figure 15 is a longitudinal sectional view of a cutter provided with a bore for the reception of the finisher shaft of the shoe machine.
Figure 16:
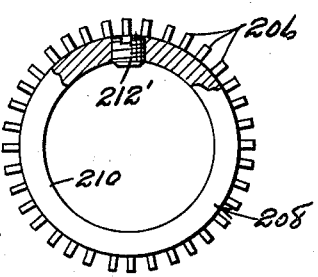
Figure 16 is an end view of the cutter of Figure 15 with a part broken away for the sake of clearness.

Figs. 15 and 16 illustrate a cutter in which the blades 206 are cast integrally with a sleeve 208 having a bore 210 fashioned to receive the finisher shaft (not shown). Blades 206 are provided with groove cutting teeth 212 aligned to cut grooves in the same manner as the foregoing cutters, and the sleeve 208 may be fixedly related to the finisher shaft by set screws 212. Blades 206 are relatively thin to operate in the same manner as the thin blades of Figs. 5 to 14, inclusive.

Having thus described certain embodiments of my invention in detail, it is, of course, understood that I do not desire to limit the scope thereof to the exact details set forth except in so far as those details may be defined in the appended claim.

I claim:

In a machine for grooving shoe soles, a cutter comprising a cylindrical body, blades extending longitudinally of the cylindrical body and provided with grooving teeth, said cylindrical body being provided with a longitudinal bore and enlarged bores at its ends, a drive shaft having an end adapted to be inserted in one of said enlarged bores and an axial threaded bore, and a bolt extending through the bore in the cylindrical body and threaded into the bore in said drive shaft for connecting the cylindrical body with the drive shaft, the head of the bolt being adapted to be housed inside the enlarged bore in the opposite end of the cylindrical body.

GEORGE C. BENNETT.